Oct. 27, 1931.  C. G. OLSON  1,829,293

SCREW LOCK

Filed May 17, 1929

Inventor:
Carl G. Olson
By Cheever, Cox & Moore
Attys.

Patented Oct. 27, 1931

1,829,293

UNITED STATES PATENT OFFICE

CARL G. OLSON, OF CHICAGO, ILLINOIS, ASSIGNOR TO SHAKEPROOF LOCK WASHER COMPANY, OF CHICAGO, ILLINOIS, A CORPORATION OF DELAWARE

SCREW LOCK

Application filed May 17, 1929. Serial No. 363,731.

My invention relates generally to screw locks and particularly to means for and methods of securing bolts and the like against unscrewing.

In general, it is a primary object of my invention to provide a simple, inexpensive and efficient means and method whereby threaded members such as screws, bolts and the like may be secured against inadvertent unscrewing.

Another object of my present invention is to provide a locking means which may be employed with threaded bolts and articles of like nature without weakening the bolt structure and without the necessity of disfiguring the threaded portion of the bolt.

Still another object is to provide means and methods whereby a bolt or screw may be so configurated that when the same has been tightened within the work, a portion of the work may be driven into the configurated portion of the bolt or screw so as to positively secure the same against inadvertent loosening.

Still another object is to provide means for securing devices as above set forth which will not affect the sightly external appearance of the screw or bolt head, thereby enabling said means to be applied in instances where neatness in external appearance is of decided importance.

More specifically, my invention contemplates the provision of a complete self-contained article of manufacture in the form of a screw or bolt which is equipped in such a manner as to enable the same, after it has been tightened against or within the work, to be positively secured against unscrewing and to this end I propose to equip said bolt or screw with an element adapted to be forced into engagement with the work and thereby cause a portion of said work to be displaced into a recess provided in the screw.

Another object of my invention is to provide a self-contained article of manufacture comprising a screw or bolt in which a locking pin is provided, said pin being adapted to be driven into the work when said screw has been tightened against the work, whereby to positively secure the screw against loosening.

These and numerous other objects and advantages will be more apparent from the following detailed description when considered in connection with the accompanying drawings wherein—

Figure 1:
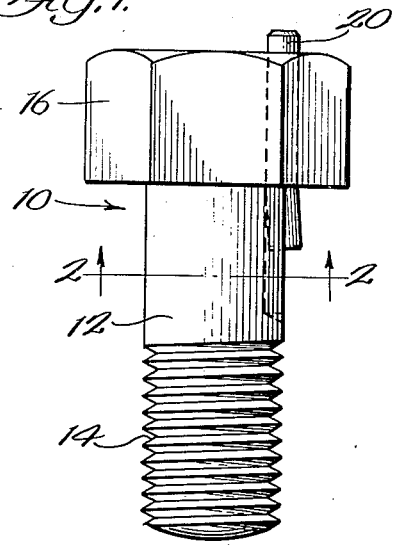
Figure 1 is a side elevational view of a threaded bolt which is constructed and equipped in accordance with the teachings of my invention.
Figure 3:
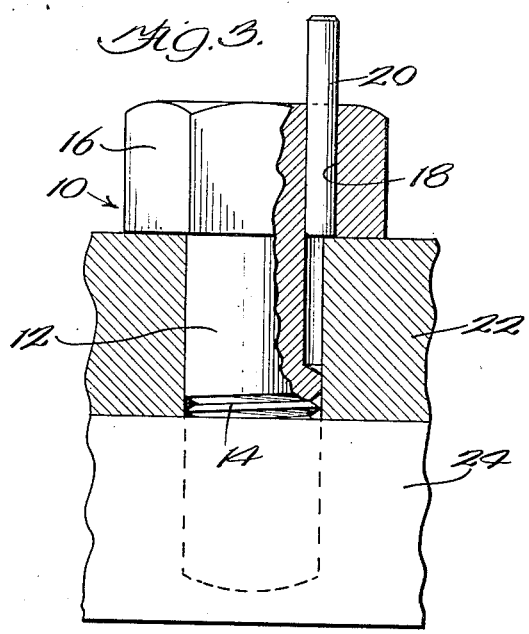
Figure 2:
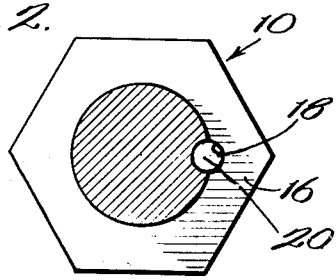
Figure 2 is a sectional view taken substantially along the line 2—2 of Figure 1.
Figure 4:
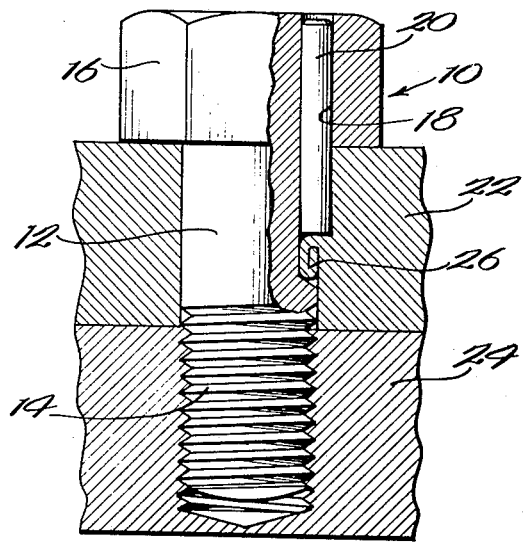

Figure 3 discloses the bolt of Figure 1 in operative association with the work before the locking pin has been driven into operative engagement with the work; and Figure 4 is a view similar to Figure 3 after said locking pin has been driven through the bolt head and into the work.

Referring now to the drawings more in detail wherein like numerals have been employed to designate similar parts throughout the various figures, it will be observed that for the purpose of illustrating one practical application of my invention, I have disclosed a threaded bolt indicated generally by the numeral 10. This bolt is provided with the usual shank 12, threaded portion 14 and head 16. I provide a cylindrical aperture 18 which passes through the head 16 and presents a peripheral opening in the shank 12 which is substantially semi-cylindrical in cross section.

A locking pin 20 is lodged within the aperture 18 as clearly shown in Figure 1. In order to prevent said locking pin from being inadvertently displaced from the aperture 18 I prefer to slightly distort or bend said pin as shown in Figure 1. In this manner the pin and bolt present a complete self-contained article of manufacture which may be sold as a unit without any possibility of losing the pin.

In Figure 3 I have shown the bolt 10 as being employed to secure the work or members 22 and 24 together. Obviously, as this bolt is screwed into the work, the pin 20 will be forced upwardly through the bolt head until it assumes the position shown in Figure 3, at which time the bolt has been tightened against the work. The pin 20 may now be driven inwardly until the outer extremity thereof is flush with the outer surface of the bolt head. In driving the pin inwardly, a section of the work 22 is sheared so as to present a locking element 26. The shearing action of the pin 20 is such as to cause the element 26 to be positively forced into the semi-cylindrical portion of the aperture 18 as clearly shown in Figure 4 and thereby effectively secure the bolt against rotative displacement. It will also be noted that the top end of the pin 20 is crowned or beveled so that after the pin has been driven slightly below or substantially flush with the outer surface of the bolt head as shown in Figure 4, a ball-peen hammer or suitable set punch may be applied to the crown of the pin so as to cause said pin to be swedged in place.

It should also be noted that the pin 20 itself, after having been driven into the work as above described, provides a very positive lock. Obviously the locking effect of the pin is aided by the metal that is removed when said pin is forced into the groove in the screw body. However, the pin serves as a very positive locking element, independently of the burr which is forced into the groove in the screw. In fact, in some instances it may be desirable to force the pin into the recess within the screw without causing a distortion or displacement of the work material. In such instances the pin would provide the only locking means. The pin serves as a key to prevent the screw or bolt from being rotated and may be securely retained in position by slightly riveting the same at the upper end thereof by means of a ball-peen hammer or the like as above described. In other words, my invention is not limited to the idea of securing a screw or bolt in position by forcing a burr into the screw recess, but also contemplates the use of a locking pin which provides a key for rendering the screw non-rotatable after it has been tightened against the work.

By practicing my improved method of locking bolts, screws and the like in position, it is only necessary to preliminarily provide a recess or aperture in the screw body, and after the screw has been applied to the work, to displace or shear a portion of the work in such a manner as to effect a positive locking engagement of the sheared portion of the work with the screw body. In practicing my improved method, the screw body is recessed in such a manner as to not affect to any substantial degree, the original strength of the screw or bolt. That is to say, to provide the cylindrical opening 18 in the bolt head and the semi-cylindrical opening in the screw shank which forms a continuation of the cylindrical opening in the head, does not in any sense weaken the screw. Furthermore, this opening may be provided in a very convenient manner as by drilling, and the locking pin may be constructed of suitable hardened steel rod stock. It will also be apparent that the recess or aperture provided in the screw body in no way disfigures the threads thereof but is merely formed in the head or shank portion. Obviously, the invention is applicable to varied forms of screws, bolts and the like. Another advantage resulting from the use of the above described invention resides in the fact that a screw or bolt may be securely locked in position without impairing the external appearances of the bolt or screw. In other words, after the pin 20 has been driven home, the only external evidence of its association with the bolt is the small circular head portion of the pin which is positioned substantially flush with the external surface of the bolt head It has in some instances heretofore been the practice to secure bolts in position by spot-welding and the like. Obviously, the very fact that spot-welding and methods of like nature require the work to be heated, often result in distortions and necessarily retard the speed with which the parts may be successively acted upon. My improved device precludes the necessity for heat treatment and at the same time enables bolts and screws to be secured in position in a very convenient and economical manner. Bolts and screws constructed in accordance with the teachings of my invention present a complete self-contained article of manufacture which may be applied to the work with a minimum amount of effort and skill on the part of the user. In other words, bolts and screws equipped with locking pins may be kept in stock as complete units and instantly applied and locked in position upon the work.

It will be apparent that the size and shape of the locking pins and the recesses into which said pins are inserted, may be constructed in accordance with the size of the bolts and screws with which they are to be associated and in accordance with the type of work to which said devices are to be applied. Thus, my invention is applicable in connection with a wide range of sizes, shapes and designs of screws and therefore might be said to be universally applicable as a screw locking means. In connection with bolts of the type disclosed in the drawings having enlarged heads, it is to be noted that the cylindrical opening in said head, in addition to providing a means for retaining the pin 20 in position, also provides a guideway for directing the pin into proper association with the work. That is to say, the aperture 18 within the screw head insures the positioning of the pin and renders said pin stable when the same is struck by the blow of a hammer for the purpose of upsetting the work. In other words, the aperture in the screw head laterally supports the pin during the swedging or upsetting of the work.

Having thus described my invention, what I claim as new and desire to secure by Letters Patent is:

1. A bolt having a threaded shank and a head, said bolt having an eccentrically positioned recess therein extending through the head and terminating within a peripheral section of the shank, whereby access to the work is obtained when the bolt has been positioned against the work so as to enable a portion of said work to be displaced into the portion of said recess within the shank to thereby secure said bolt and work against relative rotation.

2. In combination with a bolt having a threaded shank and a head of larger diameter than the shank, and an eccentrically positioned aperture extending through said head and communicating with a recess in the shank, a pin extending into the aperture of said bolt head, the inner end of said pin projecting beyond the outer periphery of the shank and thereby adapting the same, in response to pressure applied thereto when the bolt is associated with the work, to cause a portion of the work to be displaced into the recess in said shank and thereby secure said bolt against rotation.

3. In combination with a bolt having a threaded shank, a head and an aperture extending through said head and into said shank, a pin extending within the aperture in said head, said pin being frictionally held within said aperture against inadvertent longitudinal displacement prior to its application to the work and adapted, when pressure is applied thereto after the bolt has been applied to the work, to cause a portion of the work to be displaced into locking engagement with said bolt.

4. In combination with a bolt having a longitudinal recess therein, a substantially cylindrical pin adapted to be received by said recess, said pin being adapted, in response to pressure, to enter the bolt recess and at the same time act as a tool to cut a corresponding opening in the work, thus finding a position partly in the bolt and partly in the work to thereby positively lock the bolt in position.

5. A bolt and lock assembly, including a cylindrical shank, an enlarged head formed integral with said shank, said head being provided with an eccentrically positioned cylindrical aperture extending longitudinally of the bolt and terminating in a peripheral recess in the shank having a substantially semicircular cross-section, and a cylindrical locking pin within said aperture, said pin being adapted when pressure is exerted on the outer end thereof to force material from an associated work piece into the semi-cylindrical recess of the shank.

6. A bolt and lock assembly including a cylindrical shank, an enlarged head associated with said shank, said head being provided with an eccentrically positioned aperture extending longitudinally of the bolt, said shank having a peripheral recess which registers with a portion only of said aperture at the base of the head, the remaining portion of said aperture extending outwardly from the shank periphery, and a pin adapted to be received and guided by the longitudinal aperture, the portion of the end of said pin projecting outwardly from the peripheral recess in the shank serving, when pressure is applied longitudinally of the pin at its outer end, to cut a groove in a work piece, whereby said pin provides a lock between the shank and the work piece.

In witness whereof, I have hereunto subscribed my name.

CARL G. OLSON.